United States Patent
Wang et al.

[11] Patent Number: 6,113,107
[45] Date of Patent: Sep. 5, 2000

[54] SELF-LUBRICATED AND-ADJUSTED PISTON RING

[76] Inventors: Baodong Wang; Ping Cai; Chuansi Xue; Yumin Zhang; Xiaoshan Cai, all of c/o Room 4016, 4th Floor, Asia Hotel, Zhengzhou City, Henan 450000, P.R., China

[21] Appl. No.: 09/043,577
[22] PCT Filed: May 3, 1996
[86] PCT No.: PCT/CN96/00030
　§ 371 Date: May 26, 1998
　§ 102(e) Date: May 26, 1998
[87] PCT Pub. No.: WO97/12139
　PCT Pub. Date: Apr. 3, 1997

[30] Foreign Application Priority Data

Sep. 27, 1995 [CN] China ............................. 95222416.X

[51] Int. Cl.[7] ............................................. F16J 9/20
[52] U.S. Cl. ........................... 277/434; 277/460; 277/474
[58] Field of Search ................................ 277/434, 438, 277/447, 459, 460, 487, 489, 491, 493, 475, 474

[56] References Cited

U.S. PATENT DOCUMENTS

| | | | |
|---|---|---|---|
| 1,547,917 | 7/1925 | Holverson | 277/460 |
| 2,056,099 | 9/1936 | Grimm | 277/447 |
| 2,191,023 | 2/1940 | Longabaugh | 277/473 |
| 2,212,335 | 8/1940 | Wenzel | 277/460 |
| 2,918,340 | 12/1959 | Knoebel | 277/459 |
| 2,938,758 | 5/1960 | Phillips | 277/444 |
| 3,774,920 | 11/1973 | Sievenpiper | 277/468 |

FOREIGN PATENT DOCUMENTS

| | | |
|---|---|---|
| 2092609U | 1/1992 | China . |
| 2 517 407 | 6/1983 | France . |
| 30 38 340 A1 | 5/1982 | Germany . |

*Primary Examiner*—Anthony Knight
*Assistant Examiner*—Alison K. Pickard
*Attorney, Agent, or Firm*—Arent Fox Kintner Plotkin & Kahn PLLC

[57] ABSTRACT

This invention relates to piston compression ring assemblies, each of which consists of a main ring element and an auxiliary ring element. The assemblies can by themselves adjust the radial gaps between the assemblies and the liner, and the gaps between the assemblies and the liner, and the gaps between the assemblies and the wall of the ring groove in the piston. The two ring elements engage with each other on their flat sides, and there is a notch for accommodating lubrication oil provided in the engaging portion. The radial cuts in each ring element stagger each other by an angle of 180°. The two ring elements are good sealing and lubricating, respectively, therefore they can reduce the leakage of gas and the compensation of oil, and have a long period of use. They can thus improve the efficiency and the power of internal combustion engine, and reduce the emission and the noise of the internal combustion engine.

2 Claims, 3 Drawing Sheets

SELF-LUBRICATED AND-ADJUSTED PISTON RING

TECHNICAL FIELD OF THE INVENTION

The invention relates to a piston ring for an internal combustion engine or an air compressor, in particular, to a self-lubricated and -adjusted piston ring.

BACKGROUND OF THE INVENTION

After having been worn out, a piston ring and a cylinder liner are subject to an insufficient sealing betweenwith, and an insufficient compression in the cylinder, whereby resulting in, when an engine is running, a waste of fuel, a reduced power output, as well as difficulty to cold restarting of a stopped engine. In the internal combustion engine industry, piston rings are considered to be parts that wear out quickly. The efforts for increasing the service life of piston rings have been concentrated on improvement in anti-abrasion materials and producing processes for manufacturing them. But insufficient sealing is mainly caused by worn-out liners or rings. The piston rings replaced frequently because they wear out replacing the piston rings required, wherein dismounting and then mounting the engine, resulting in a waste of time and labor and influences its service. The inventors of this invention provided a piston compression ring assembly as a solution to overcome the above problems (China Patent No. 75790). However, the lubrication of the assembly, is not good enough, and also needs further improvements.

SUMMARY OF THE INVENTION

An object of the invention is to provide a self-lubricated and self-adjusted piston compression ring with longer service life in order to improve the above mentioned poor lubrication and to overcome the vulnerability of abrasion.

To achieve the above object, the piston rings of this invention are so arranged that each set of the rings consist of a preliminary ring member and a secondary ring member, which engage each other on their respective smooth sides. Cross sections of the preliminary and secondary ring members are in the form of a trapezoid or rectangle with an angular nick. A notch for accommodating lubricant oil is combined of the nicks. Inner and outer diameters of the preliminary ring member are equal to those of the secondary ring member respectively.

BRIEF DESCRIPTION IN DRAWINGS

Thereafter the invention is illustrated with the aids of attached drawings, wherein, FIG. 1 is a schematic half cut away view showing a self-lubricated and -adjusted piston compression ring arranged on a piston according to the invention;

Figure 1:
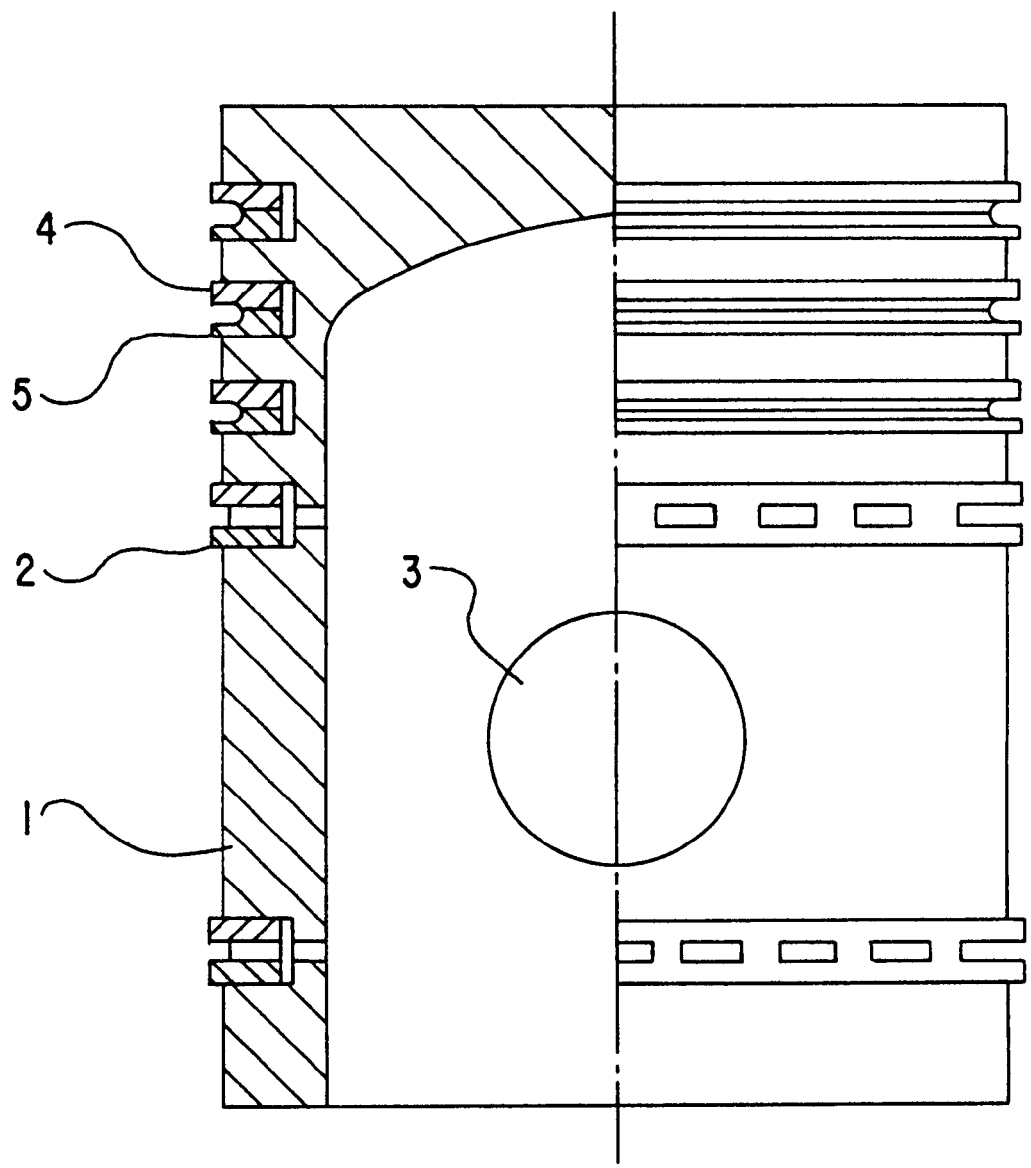
Figure 2:
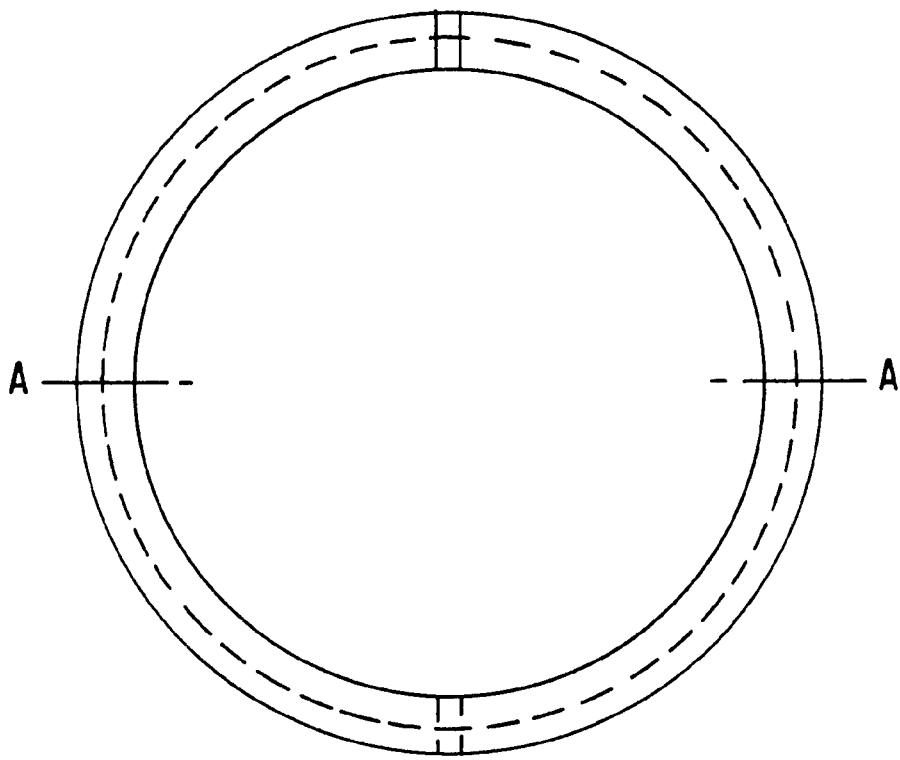
FIG. 2 is a schematic top view showing a circumferential relation of radial cuts among rings being mounted on a piston according to the invention.
Figure 3:
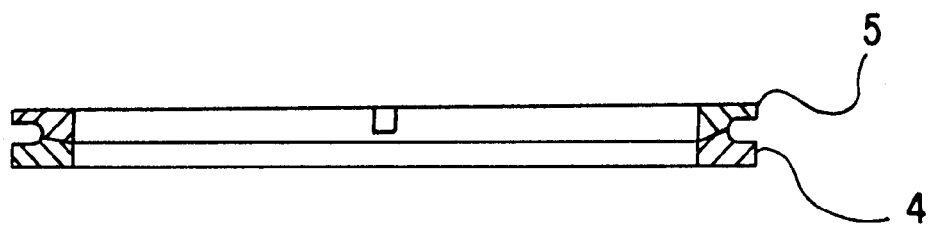
FIG. 3 is a section view along A—A direction on FIG. 2.

Thereafter embodiments according to the invention are illustrated in detail with reference to the attached drawings, wherein the reference numbers in the drawings are interpreted as follows:

1—Piston; 2—Oil Checking Ring; 3—Pin Hole in the Piston

4—Preliminary Ring Member; 5—Secondary Ring Member.

As shown in the drawings, two oil checking rings and three piston compression rings are arranged on a piston in an internal combustion engine in X195 Serial made in China.

Conventionally, one oil checking ring and two piston compression rings, or one oil checking ring and three piston compression rings, or two oil checking rings and three piston compression rings, are mounted on a piston in other serials. In general, two or three piston compression rings each with a single radial cut are arranged on an average piston. Two piston compression rings are arranged on a piston (not at the same level) in a circumferential span of 180°, while three compression rings are in a span of 120°.

Figure 4A:
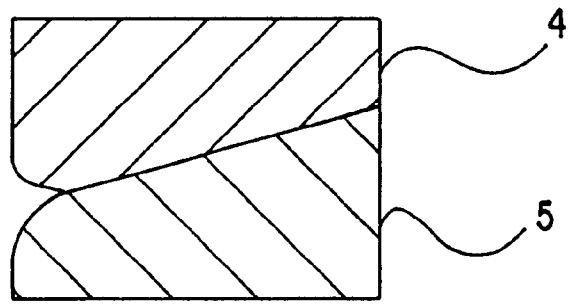
FIG. 4a is a cross section view of a notch in a form of R for accommodating lubricant oil in an embodiment according to the invention.
Figure 4B:
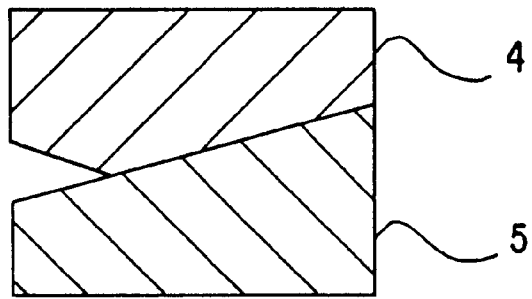
FIG. 4b is a cross section view of a notch in form of V for accommodating lubricant oil in an another embodiment according to the invention.
Figure 4C:
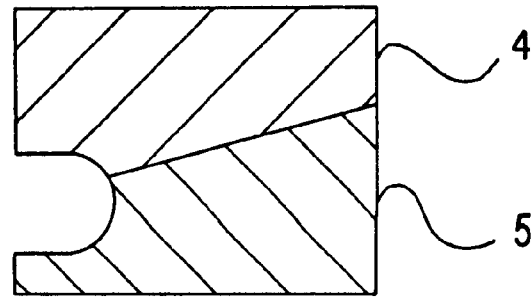
FIG. 4c is a cross section view of a notch in form of U for accommodating lubricant oil in a still another embodiment according to the invention.

Whereas, a self-lubricated and self-adjusted piston compression ring according to the invention for an internal combustion engine or an air compressor consists of a preliminary ring member 4 and a secondary ring member 5, which engage each other on their smooth sides. Cross sections of the preliminary and secondary ring members 4, 5 are formed as a trapezoid or a rectangle with an angular nick, and furthermore, inner and outer diameters of the preliminary ring member are equal to those of the secondary ring member. A notch for accommodating lubricant oil comprises angular nick portions of the preliminary ring member 4 and the secondary ring member 5, whereby a portion of the assembled cross-section assumes in a form of U, V or γ (see FIG. 4a, 4b, 4c). In each of the preliminary ring member 4 and secondary ring member 5, a radial cut is provided respectively. The redial cuts on the preliminary and secondary ring member 4 and 5 are arranged in a circumferential span of 180°. Two piston compression rings are so arranged on a piston that their radial cuts are spanned circumferentially at an angle of 180° betweenwith, and in the other case, the cuts in three rings are in a span of 120° between adjacent ones.

As the internal combustion engine is running a piston with compression rings and oil checking rings moves reciprocally in a cylinder. Therefore, due to the abrasion between the rings and the liner, the size of the cuts gradually increase and become wider. In addition, as the repeatedly rings slide and vibrate in the ring groove on the piston, the cuts continue to get wider. Therefore, the gas leakage through the cuts, insufficient sealing, combustion of lubricant oil, reduction in compression ratio and poor dynamic performances become substantial. The self-lubricated and self-adjusted piston compression ring according to the invention will have a longer service life so as to overcome the above shortcomings.

When the self-lubricated and -adjusted piston compression ring is located in the ring groove, because the press on the preliminary ring member 4 against the contact surface of the cylinder liner differs from the that on the secondary ring member, and particularly that on the secondary ring member 5 is larger than that on the preliminary ring member 4, the abrasion on the secondary ring member 5 will be, after a period of engine running, greater than that on the preliminary ring member 4. Therefor a radial and axial micro glide is to develop between the preliminary ring member 4 and the secondary ring member 5, reducing the sizes of the cuts and the gaps between the rings and ring groove and between the rings and the liner. This takes a self-adjusting function, in addition to a self-lubricating function. The radial cuts of the rings are arranged in a span of a certain angle with each other, and closed with each other, so a direct gas leakage is impossible.

The advantages of the invention:

Compared with a conventional piston compression ring, the self-lubricated and -adjusted piston compression ring has some advantages as follows:

1. Its service life is longer, it is replaced in an engine less frequently;
2. When an engine is in operation, the self-lubricated and -adjusted piston compression ring can automatically adjust the gaps between the compression ring and the liner, and between the ring and the ring groove, reducing gas leakage and combustion of lubricant oil. And because of the self-lubricating function, the friction between the piston rings and the liner is reduced, and the dynamic and economic performances are improved.
3. The self-lubricated and -adjusted piston compression ring reduces the ring vibration, and hence the noise of the internal combustion.

What is claimed is:

1. A self-lubricated and self-adjusted compression piston ring group in a piston reciprocating on a liner of a cylinder, comprising:

a preliminary ring member having a first facing side; and
a secondary ring member having a second facing side and another side opposite the second facing side, wherein the first facing side of the preliminary ring member and the second facing side of the secondary ring member smoothly engage each other, the second facing side is inclined relative to the another side in a radial direction away from a central axis of the piston, wherein the preliminary ring member is worn away by the liner at a rate slower than the secondary ring member, and the preliminary and secondary ring members each have an angular nick near the liner and the first and second facing sides to form a notch that accommodates lubricant oil.

2. A self-lubricated and self-adjusted compression piston ring according to claim 1, wherein the cross section of the notch is one of U, V, and $\gamma$ shaped, wherein $\gamma$ shaped is characterized as being substantially V shaped with curved end faces.

* * * * *